United States Patent [19]
Camilleri

[11] Patent Number: 5,901,816
[45] Date of Patent: May 11, 1999

[54] AIR CYLINDER-DRIVEN WHEEL CHOCK

[76] Inventor: Tony C. Camilleri, 43 Tanager Square, Brampton, Ontario, Canada, L6Z 1X1

[21] Appl. No.: 09/026,142

[22] Filed: Feb. 19, 1998

[51] Int. Cl.$^6$ .................................. B60T 1/00; B60T 3/00
[52] U.S. Cl. .............................................. 188/32; 188/4 R
[58] Field of Search .................................. 188/2 R, 4 R, 188/32; 410/36

[56] References Cited

U.S. PATENT DOCUMENTS

| | | | |
|---|---|---|---|
| 3,086,619 | 4/1963 | Grotz | 188/4 R |
| 3,176,798 | 4/1965 | Nesselberger | 188/4 R |
| 3,625,313 | 12/1971 | Lowrie | 188/4 R |
| 4,354,580 | 10/1982 | Delasantos et al. | 188/4 R |
| 4,911,270 | 3/1990 | Hudson | 188/32 |
| 5,497,857 | 3/1996 | Warren et al. | 188/4 R |

*Primary Examiner*—Chris Schwartz

[57] ABSTRACT

A combination of a mechanically driven chock and a truck trailer including a wheel chock having a bottom face, a top face, a slanted front face, and an arcuate rear face, the front face having a plurality of threaded bores formed therein, wherein a width of the wheel chock is equal to that of two wheels of the truck trailer in side-by-side relationship; and an air cylinder having a fixed portion coupled to an outer face of the mounting plate via a pair of brackets and situated at an angle of 45 degrees with respect to the horizontal and a movable portion having a length equal to that of the fixed portion and an inboard end slidably situated within the fixed portion and extendible rearwardly and downwardly only upon the actuation thereof, the movable portion of the air cylinder further including a square planar plate coupled at a central extent thereof to an outboard end thereof in perpendicular relationship therewith, the plate being screwably coupled to the front face of the chock, wherein a portion of the movable portion of the air cylinder extends through the plate and is inserted within a central bore of the wheel chock, wherein the air cylinder is adapted to be actuated by a user within a cab of the truck thereby engaging the wheel chock with the frontmost wheel of the truck trailer such that the bottom face of the wheel chock resides in abutment with the ground.

2 Claims, 2 Drawing Sheets

AIR CYLINDER-DRIVEN WHEEL CHOCK

BACKGROUND OF THE INVENTION

1. Field of the Invention

The present invention relates to chocks and more particularly pertains to a new air cylinder-driven wheel chock for automatically inserting a wheel chock into position when desired.

2. Description of the Prior Art

The use of chocks is known in the prior art. More specifically, chocks heretofore devised and utilized are known to consist basically of familiar, expected and obvious structural configurations, notwithstanding the myriad of designs encompassed by the crowded prior art which have been developed for the fulfillment of countless objectives and requirements.

Known prior art chocks include U.S. Pat. No. 5,158,158; U.S. Pat. No. 5,137,121; U.S. Pat. No. Des. 316,243; U.S. Pat. No. 5,104,170; U.S. Pat. No. Des. 348,966; and U.S. Pat. No. 5,249,905.

In these respects, the air cylinder-driven wheel chock according to the present invention substantially departs from the conventional concepts and designs of the prior art, and in so doing provides an apparatus primarily developed for the purpose of automatically inserting a wheel chock into position when desired.

SUMMARY OF THE INVENTION

In view of the foregoing disadvantages inherent in the known types of chocks now present in the prior art, the present invention provides a new air cylinder-driven wheel chock construction wherein the same can be utilized for automatically inserting a wheel chock into position when desired.

The general purpose of the present invention, which will be described subsequently in greater detail, is to provide a new air cylinder-driven wheel chock apparatus and method which has many of the advantages of the chocks mentioned heretofore and many novel features that result in a new air cylinder-driven wheel chock which is not anticipated, rendered obvious, suggested, or even implied by any of the prior art chocks, either alone or in any combination thereof.

To attain this, the present invention generally comprises a truck trailer having a bottom face with a plurality of wheels mounted thereon. As shown in FIG. 1, the bottom face has a linear longitudinal support coupled thereto. A mounting plate is integrally connected to the longitudinal support and depends downwardly therefrom in front of and above a frontmost one of the wheels for reasons that will become apparent hereinafter. FIGS. 2 & 3 show a wheel chock having a horizontally oriented planar bottom face with a rectangular configuration and a horizontally oriented planar top face. Extending upwardly and rearwardly between the bottom and top face is a slanted planar front face. The wheel chock further includes an arcuate rear face with a radius of curvature equal to that of the wheels of the truck trailer. For reasons that will be set forth later, the front face has a plurality of threaded bores formed therein. Finally, an air cylinder is provided having a fixed portion coupled to an outer face of the mounting plate and situated at an angle with respect to the horizontal. Associated therewith is a movable portion having an inboard end slidably situated within the fixed portion. The movable portion is extendible rearwardly and downwardly only upon the actuation thereof. The movable portion of the air cylinder further includes a square planar plate coupled at a central extent thereof to an outboard end thereof in perpendicular relationship therewith. As shown in FIG. 3, the plate is screwably coupled to the front face of the chock. By this structure, the air cylinder is adapted to be actuated by a user within a cab of the truck thereby engaging the chock with the frontmost wheels of the truck trailer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new air cylinder-driven wheel chock apparatus and method which has many of the advantages of the chocks mentioned heretofore and many novel features that result in a new air cylinder-driven wheel chock which is not anticipated, rendered obvious, suggested, or even implied by any of the prior art chocks, either alone or in any combination thereof.

It is another object of the present invention to provide a new air cylinder-driven wheel chock which may be easily and efficiently manufactured and marketed.

It is a further object of the present invention to provide a new air cylinder-driven wheel chock which is of a durable and reliable construction.

An even further object of the present invention is to provide a new air cylinder-driven wheel chock which is susceptible of a low cost of manufacture with regard to both materials and labor, and which accordingly is then susceptible of low prices of sale to the consuming public, thereby making such air cylinder-driven wheel chock economically available to the buying public.

Still yet another object of the present invention is to provide a new air cylinder-driven wheel chock which provides in the apparatuses and methods of the prior art some of the advantages thereof, while simultaneously overcoming some of the disadvantages normally associated therewith.

Still another object of the present invention is to provide a new air cylinder-driven wheel chock for automatically inserting a wheel chock into position when desired.

Even still another object of the present invention is to provide a new air cylinder-driven wheel chock that includes a vehicle having a bottom face with a plurality of wheels mounted thereon. Also included is a wheel chock. Next provided is a mechanical mechanism for engaging the wheel chock with one of the wheels of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
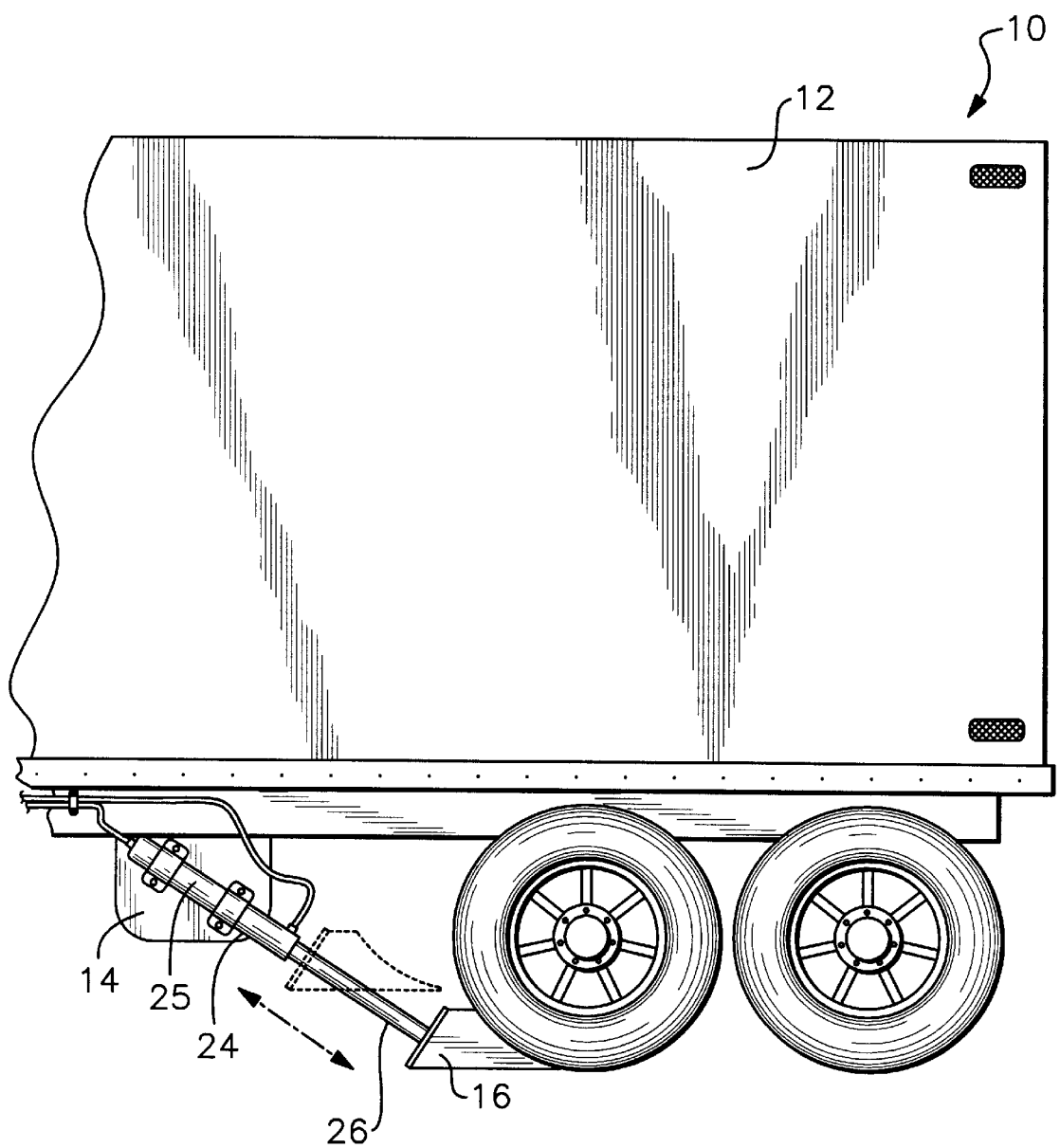
FIG. 1 is a perspective view of a new air cylinder-driven wheel chock according to the present invention.
Figure 2:
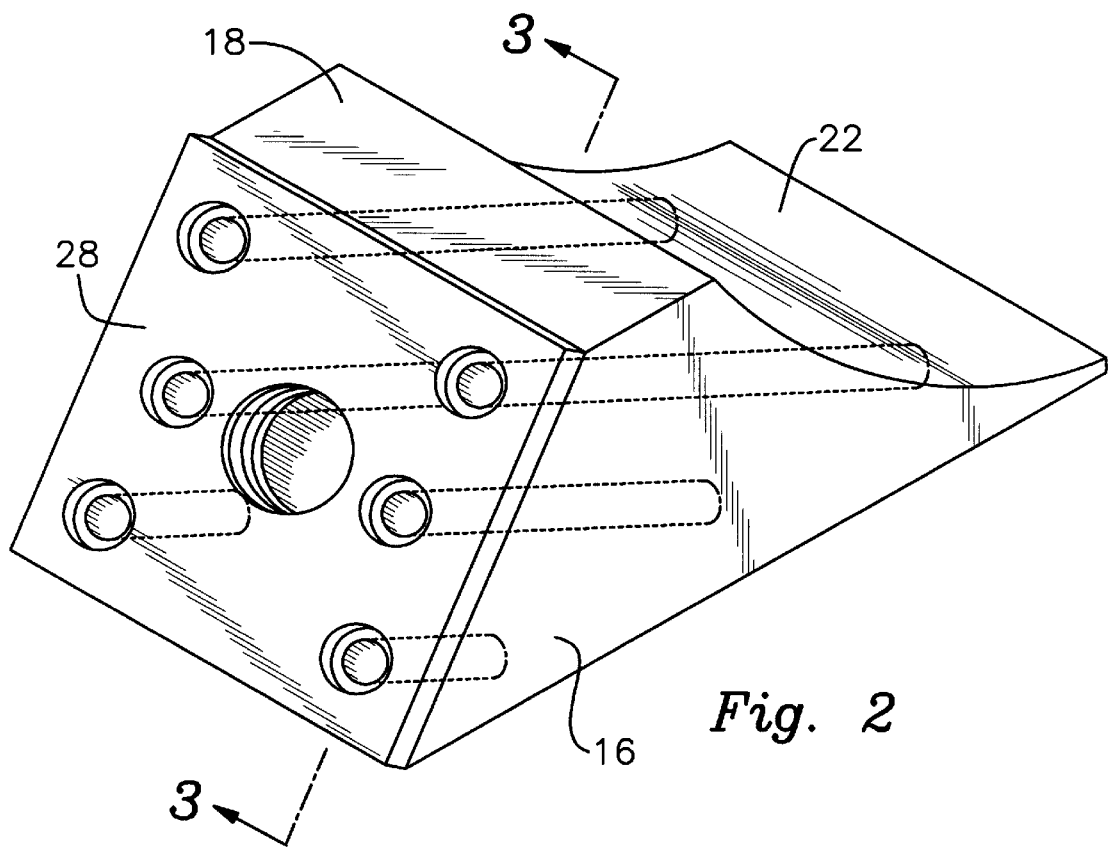
FIG. 2 is a detailed front perspective view of the present invention.
Figure 3:
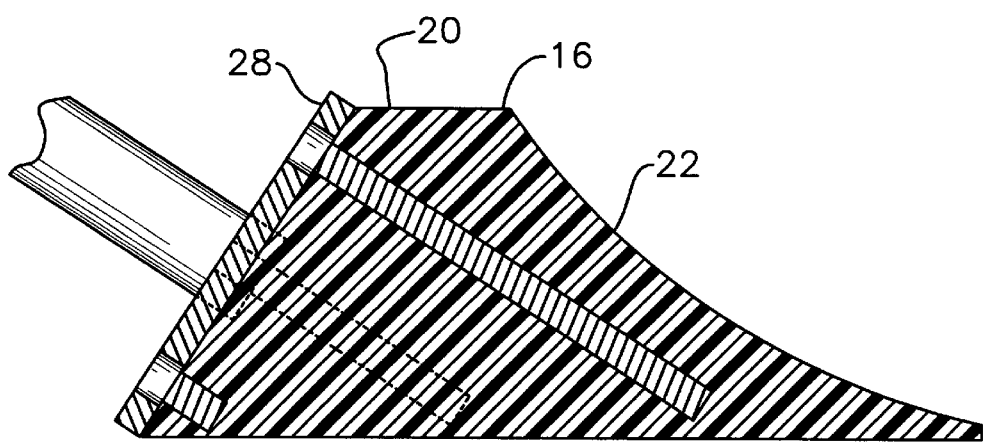
FIG. 3 is a cross-sectional view of the present invention taken along line 3–3 shown in FIG. 2.

With reference now to the drawings, and in particular to FIGS. 1 through 3 thereof, a new air cylinder-driven wheel chock embodying the principles and concepts of the present invention and generally designated by the reference numeral 10 will be described.

The present invention, designated as numeral 10, includes a truck trailer 12 having a bottom face with a plurality of wheels mounted thereon. As shown in FIG. 1, the bottom face has a linear longitudinal support coupled thereto. A mounting plate 14 is integrally connected to the longitudinal support and depends downwardly therefrom in front of and above a frontmost one of the wheels for reasons that will become apparent hereinafter. As shown in FIG. 1, the mounting plate resides in a vertical plane which is in line with the intended direction of motion of the trailer.

FIGS. 2 & 3 show a wheel chock 16 having a horizontally oriented planar bottom face with a rectangular configuration and a horizontally oriented planar top face 18. Extending upwardly and rearwardly between the bottom and top face is a slanted planar front face 20. The wheel chock further includes an arcuate rear face 22 with a radius of curvature equal to that of the wheels of the truck trailer. For reasons that will be set forth later, the front face has a plurality of threaded bores formed therein. In the preferred embodiment, a width of the wheel chock is equal to that of two of the wheels of the truck trailer in side-by-side relationship.

Finally, an air cylinder 24 is provided having a fixed portion 25 coupled to an outer face of the mounting plate and situated at an angle with respect to the horizontal. Such angle is preferably about 45 degrees. Associated therewith is a movable portion 26 with a length equal to that of the fixed portion and having an inboard end slidably situated within the fixed portion. The movable portion is extendible rearwardly and downwardly only upon the actuation thereof. This is accomplished by the receipt of pressurized air by the fixed portion, as is conventional.

The movable portion of the air cylinder further includes a square planar plate 28 fixedly coupled at a central extent thereof to an outboard end thereof in perpendicular relationship therewith. As shown in FIG. 3, the plate is screwably coupled to the front face of the chock. To provide a further robust coupling, a portion of the movable portion of the cylinder may extend through the plate and be inserted within a central bore of the chock, as shown in FIG. 3. By this structure, the air cylinder is adapted to be actuated by a user within a cab of the truck thereby engaging the chock with frontmost wheels of the truck trailer such that the bottom face of the chock resides in abutment with the ground. It should be noted that as an option, a pair of chocks may be included for wheels of each side of the trailer.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A combination of a mechanically driven chock and a truck trailer having a bottom frame with a plurality of wheels mounted thereon, the bottom frame having a linear longitudinal support coupled thereto with a mounting plate integrally connected thereto and depending downwardly therefrom in front of and above a frontmost one of the wheels, wherein the mounting plate resides in a vertical plane which is substantially in line with an intended direction of motion of the trailer, the combination comprising:

a wheel chock having a horizontally oriented planar bottom face with a rectangular configuration, a horizontally oriented planar top face, a slanted planar front face extending upwardly and rearwardly between the bottom and top face, and an arcuate rear face with a radius of curvature substantially equal to that of the wheels of the truck trailer, the front face having a plurality of threaded bores formed therein, wherein a width of the wheel chock is substantially equal to that of two wheels of the truck trailer in side-by-side relationship; and an air cylinder having a fixed portion mounted to an outer face of the mounting plate via a pair of brackets and fixed at an angle of about 45 degrees with respect to the horizontal and a movable portion having a length substantially equal to that of the fixed portion and an inboard end slidably situated within the fixed portion and extendible rearwardly and downwardly at a 45 degree angle only upon the actuation thereof such that the wheel chock engages the frontmost wheel and a ground surface beneath the wheel simultaneously without need for vertical adjustment of the fixed portion, the movable portion of the air cylinder further including a square planar plate coupled at a central extent thereof to an outboard end thereof in perpendicular relationship therewith, the plate being fastened to the front face of the chock, wherein a portion of the movable portion of the air cylinder extends through the plate and is inserted within a central bore of the wheel chock, wherein the air cylinder is adapted to be actuated by a user within a cab of the truck thereby engaging the wheel chock with the frontmost wheel of the truck trailer such that the bottom face of the wheel chock resides in abutment with the ground.

2. A combination as set forth in claim 1 wherein the front face of the chock has six threaded bores formed therein.

* * * * *